United States Patent
Caesar

[11] Patent Number: 5,711,865
[45] Date of Patent: Jan. 27, 1998

[54] ELECTROLYTIC GAS PRODUCER METHOD AND APPARATUS

[75] Inventor: Mervyn Leonard Caesar, Runaway Bay, Australia

[73] Assignees: Rhyddings Pty Ltd, Robina; Renjean Pty Ltd, Kenmore, both of Australia

[21] Appl. No.: 525,588

[22] PCT Filed: Mar. 2, 1994

[86] PCT No.: PCT/AU94/00092

§ 371 Date: Oct. 10, 1995

§ 102(e) Date: Oct. 10, 1995

[87] PCT Pub. No.: WO94/21844

PCT Pub. Date: Sep. 29, 1994

[30] Foreign Application Priority Data

Mar. 15, 1993 [AU] Australia .................. PL7825

[51] Int. Cl.$^6$ .................. C25B 1/06; C25B 15/08; C25B 9/00

[52] U.S. Cl. .................. 205/628; 204/228; 204/229; 204/270; 204/277; 204/278; 204/292; 204/293; 204/290 R; 204/279; 204/284; 204/294

[58] Field of Search .................. 204/278, 270, 204/228, 229, 290 R, 284, 294, 293, 292, 277; 205/628, 633, 637

[56] References Cited

U.S. PATENT DOCUMENTS

| | | |
|---|---|---|
| 3,310,483 | 3/1967 | Rhodes .................. 204/278 X |
| 3,311,097 | 3/1967 | Mittelstaedt .................. 204/278 X |
| 4,206,029 | 6/1980 | Spirig .................. 204/268 |
| 4,424,105 | 1/1984 | Hanson .................. 204/278 X |
| 4,450,060 | 5/1984 | Gonzalez .................. 204/270 X |
| 4,747,925 | 5/1988 | Hasebe et al. .................. 204/270 |
| 5,037,518 | 8/1991 | Young et al. .................. 205/628 |
| 5,082,544 | 1/1992 | Willey et al. .................. 204/270 |
| 5,211,828 | 5/1993 | Shkarrand-Moghaddam .................. 204/278 X |

Primary Examiner—Donald R. Valentine
Attorney, Agent, or Firm—Dvorak & Orum

[57] ABSTRACT

Electrolytic gas producer apparatus is provided wherein a water inlet has a pressure sensor and solenoid valve control passes water through a filter by pump to a reservoir. Cell chambers maintain electrolyte by supply pump and solenoid valve delivering to the cell via solenoid valves responsive to a level sensor. Gas outlet apertures extend into a polling manifold via solenoid valves and thence to a wash tank. The gas is removed from the tank via a manifold to a vacuum pump which draws the gas through a first filter including a drain line and a secondary filter for residual moisture removal. After the pump the gas passes under water in a flashback arrester filled with metal mesh. The gas then travels to a moisture removing filter and delivery pumps for delivery via intermediate solenoid valves, an outlet manifold, and final solenoid valves which control delivery to an electronically monitored outlet flashback arrester comprising infrared sensors to detect and signal a flashback condition.

20 Claims, 15 Drawing Sheets

ELECTROLYTIC GAS PRODUCER METHOD AND APPARATUS

This invention relates to electrolytic producer apparatus.

This invention has particular but not exclusive application to electrolytic producer apparatus for producing mixed hydrogen and oxygen gases from water for use as a fuel or feedstock, and for illustrative purposes reference will be made to such application. However, it is to be understood that this invention could be used in other applications, such as producing oxygen and hydrogen mixtures for technical and/or analytical use, and other electrolytic processes having a gas output.

The use of electrolysis for the production of hydrogen and oxygen gases is well known. In general, such apparatus have comprised an electrolytic cell including an anode and cathode immersed in an electrolyte solution comprising a dilute aqueous solution of a mineral acid. The apparatus have generally been operated by the application of direct current of voltage sufficient to effect electrolysis water. The produced gases have generally been kept separate by means of a cell divider dividing the head space of the cell, and generally including level control means or the like, such that explosive oxygen/hydrogen mixtures are substantially minimized in the output streams. Certain apparatus utilizes a salt bridge connecting two separate half cells.

The prior art apparatus suffer from several disadvantages. The separation of the gases is rarely efficient that the rise of explosion is eliminated. Backpressure differential between the cell halves may result in electrolyte being displaced to the point where the gases mix without inhibition. Additionally, plain electrode surfaces of such apparatus are subject to ionic polarization requiring the application of an overpotential to continue electrolysis.

The present invention aims to substantially alleviate the above disadvantages and to provide electrolytic producer apparatus which will be reliable and efficient in use. Other objects and advantages of this invention will hereinafter become apparent.

With the foregoing and other objects in view, this invention in one aspect resides broadly in gas production apparatus including:

a housing containing an electrolyte;

electrodes at potential difference sufficient co cause electrolysis of said electrolyte to form a gas;

supply means adapted to maintain said electrolyte, and collection means for gases produced by said to electrolysis.

The apparatus is preferably for the production of hydrogen and oxygen gases from water and to this end the electrolyte is preferably comprises an dilute aqueous solution of a mineral acid catalyst selected from the hydrogen halide acids, sulphuric or nitric acids. Preferably, the catalyst comprises hydrochloric acid.

The housing may be of any suitable material resistant to the electrolyte. Preferably, the housing is of an insulating material to prevent losses due to conduction through the housing such as impedance and hysteresis losses. The housing is preferably substantially sealed with the entry of maintenance water and exit of produced gases being via appropriately valved inlet and outlet apertures. The The electrodes may take any suitable form and are preferably non sacrificial under expected electrolytic conditions. For example, the electrodes may comprise an inert conductive substrate such as noble metal, graphite or stainless steel, with or without a surface activating catalyst. Preferably, the electrodes comprise stainless steel mesh material having a coating of platinum black deposited thereon.

The electrodes are preferably supported rigidly within the housing such that distortion and shorting in use may be minimised. For example, the electrodes may be mounted in electrode frames which support the electrodes. The mounting frames may provide for setting the interelectrode distance by being adapted to engage locating means associated with housing. For example the housing may be provided with grooves or the like adapted to receive the frame edges, the frame and electrode assemblies being retained therein by a top cover member of the housing.

Preferably, however, the electrodes comprise a plurality of electrode assemblies of alternating polarity and comprising the preferred stainless steel mesh electrode bodies configured with insulative frame portions such that the electrodes may be stacked in close parallel configuration to form a pack of electrodes which may be retained by close conformation with the interior of the housing. The electrode frame may also include conductive portions adapted to beer on corresponding insulative portions of the adjacent electrode frames to provide for mounting of a conductive pole, whereby the conductive poles of like electrodes may be bussed together for connection to one pole or the other of a supply of direct current.

Preferably the separation between the plates in the cell is closely controlled to ensure consistency of production across the cell. In aqueous acid electrolysis systems, such as those utilizing electrolytes of deionized water/hydrochloric acid of concentration of about $2.4 \times 10^{-3}$M, spacing of about 4 mm between the electrode surfaces provides for economic current densities to be used, in terms of providing high output per unit volume of apparatus.

The use of spacings much less than 4 mm results in problems with heat dissipation with the attendant risk of distortion and shorting of the electrodes. Surprising by, the use of much greater spacings than 4 mm results in a dramatic decrease in efficiency of the apparatus in terms of the amount of produced gas at standard temperature and pressure being produced for a given quantity of electrical power consumed. It is theorized that the gas evolution and flow upward through the electrolyte whilst constrained between the electrodes has an advantageous effect on the reactive surface of the electrodes. For example, it may be that a polarized layer at an electrode which provides resistance to the passage of current and thus dissipates energy as heat may be disrupted by turbulence caused by the gas entrained in the relatively narrow interelectrode space. Constrainment of convective movement in the electrolyte may also contribute to this phenomenon. The electrodes are preferably supported clear of the bottom of the housing such that the electrolyte bay circulate to maintain substantial consistency of composition throughout the housing and to provided for improved dispersion of any locally evolved heat.

Accordingly, in a further aspect this invention resides broadly in apparatus for gas production including:

a housing containing an electrolyte, and a plurality of substantially planar electrodes disposed in substantially parallel spaced relation in said electrolyte, alternate ones of the electrodes being connected to respective poles of a direct current supply of potential difference sufficient to cause electrolysis of said electrolyte, wherein the inter electrode distance is selected whereby produced gases are constrained by adjacent electrodes to cause turbulence in said electrolyte at the respective electrode planar surfaces.

The supply means may take any suitable form consistent with the function of maintaining the electrolyte as it is consumed by the electrolytic process and will be determined from the gas to be produced. In the preferred hydrogen/oxygen producing apparatus, the supply means is a water supply.

The water supply means may take any suitable form such as pressurized supply from mains (reticulated) water supply of from a treated water feedstock if this is appropriate. The water component of the electrolyte is preferably purified water prepared by one or more of filtration, reverse osmosis, distillation or deionization. In order to reduce particulate contamination of the water feed, the supply is preferably fitted with a submicron filter.

Where the water supply contains trace impurities such as dissolved salts, the apparatus may be configured to periodically reverse the direction of current flow between the electrodes, thereby disrupting deposition of depositable salts on the electrodes. Any precipitated impurities may fall to the bottom of the housing, which may be provided with drain means such that the impurities may be periodically purged and the housing may be drained for maintenance.

Preferably the water supply includes control means responsive to electrolyte level and/or acid concentration. For example, the water supply may be controlled by control means such as a float controlled valve means, electronic level sensing means operable to switch a valve by means of a solenoid or other electromechanical actuator, or the like. Alternatively, the control means may include gravimetric pH sensing sensor means. Preferably, the water is admitted to the bottom of the housing.

Preferably, the water feed is supplied To an intermediate tank prior to admission to the housing, the intermediate tank being configured as a water trap for gas output from the apparatus. By this means, any acid containing electrolyte entrained in the produced gas is stripped by the feed water in the intermediate tank to be cycled back to the housing.

The collection means preferably takes the form of a top portion of the housing including an aperture such that gases rising to the top of the housing may be collected member of the preferred electrode assemblies and be conveyed from the housing thereby. Preferably, the aperture includes or leads to separator means adapted to return at least some any electrolyte mist entrained in the gas flow back to the housing. For example, the aperture may include or pass a separator comprising a passage so shaped and configured as to encourage collection of entrained electrolyte such that returns by gravity to the cell.

An example of such apparatus includes a blind sleeve having a hollow conical collection member disposed on blind end thereof, the apex of the conical collection member being directed substantially upstream of the gas flow, the conical surface having one or more delivery openings therethrough disposed away from the apex and providing a passage for gas downstream of the separator. Produced gas having entrained electrolyte impinges on the sleeve wall and end, and the conical surface whereupon a substantial part the entrained electrolyte is deposited to run down the sleeve and conical surface and drip back into the housing.

The apparatus may comprise a plurality of housing portions each with its own supply, electrodes and collection means each comprising a cell assembly of the apparatus.

The apparatus is preferably driven by power supply means which is subject to control means responsive to one or more conditions of the apparatus. Where multiple cell assemblies are used, it is preferred that each be provided with its own controlled power supply whereby individual power characteristics of the cell assemblies may be accommodated and to promote reliable operation, and to permit varying process conditions in each cell as necessary or desirable.

Preferably, the control means for the power supply forms a logical or physical part of an integrated control portion of the apparatus, adapted to control electrolyte parameters of such as level, composition and temperature, power characteristics such as voltage and current, and conditions at the output side of the apparatus downstream of the housing such as gas delivery pressure and temperature. Preferably, the control portion comprises programmable logic control means to control all aspects which may be so controlled. For example, current/voltage regimes for each cell assembly may be at least in part controlled by the programmable logic control means in response to sensor inputs such as a temperature sensor, a back pressure sensor or like sensors associated with each cell assembly.

Preferably, the output of the apparatus is also monitored by the controller means. For example, an operator may wish to query the controller means in terms of gas volume production, relative efficiency, temperature, pressure or any other chemical or physical quantity including chemical composition. This data may also be utilized as primary control data for operation of the apparatus via the controller.

Apparatus for electrolysis of acidified water produces an explosive mixture of hydrogen and oxygen in substantially stoichiometric proportions, which mixtures are explosive both in isolation and in admixture with air over a relatively wide range of compositions. Accordingly, the apparatus is preferably provided with means adapted to prevent or ameliorate the effect of ignition of the gas mixtures. For example, the apparatus may be configured and controlled such that dead spaces which may accumulate gas in the housing or downstream thereof may be minimized by design and/or control.

Further, the gas flow path downstream of the housing may be provided with passive control means such as flashback arrestor means. For example, the gas path may include one or more flashback arresters comprising an arrestor housing having a gas inlet and a gas outlet and being packed with a thermally massive porous material such as stainless steel wool. The arrestor housing may be partially filled with water and the gas inlet led by conduit to a point below the surface of the water. The gas outlet may collect from a minimized gas space above the water.

In use, a flashback condition from upstream of the flashback arrestor will be extinguished at the inlet beneath the surface of the arrestor water. A flashback from the upstream side will be diffused into the stainless steel wool and extinguished by reduction of the flame front to a temperature below the activation temperature of the gas mixture.

In addition to passive systems, there may be provided flashback arrestor means including sensor means adapted sense a flashback condition and to be read by the preferred programmable logic controller which may then in turn operate appropriately to remove the flashback condition. For example here may be provided sensors monitoring one or more of shock, temperature or infrared or ultraviolet radiation in a gas flow path and the sensing of a flash back condition being interpreted by the controller, whereupon the gas flow may be interrupted or diminished by one or more of high speed valve means, current interrupting means or the like. The response to flashback being sensed may also include shutting down of non critical components such as pumps and the like to shut down all functions of the apparatus pending resolution of the flashback causing condition.

The flashback arrestor may include a relatively thin, long but low volume path for the gas having a sensor and fast valve at opposed ends thereof, whereby the propagating flashback condition at the sensor triggers the closure of the valve. Sensors and valves may be paired at either end of the tube to detect and respond to a flashback condition propagated from either end of the tube.

The end use to which the produced mixture of hydrogen and oxygen may be put includes as a feedstock for separation apparatus, a fuel for fuel cells of heat engines or for analytical processes and especially calorimetric analysis, welding or cutting of materials or the like.

In one embodiment it is envisaged that the gas may be produced on demand and metered into a heat engine such as an internal combustion engine where it may be used in admixture with air or as substantially the whole of inducted charge. Since it is desirable to produce the has on demand as opposed to storing the gas, the internal combustion engine may be provided with generating means adapted supply electrical energy to the power supply means of apparatus.

Accordingly, the gas output may be connected to an internal combustion engine adapted to perform useful work and the engine may also be connected to power generation means for generating electricity for the power supply means of the apparatus. By this means an engine which may be required do mechanical work may utilize excess power to generate a power supply for the apparatus.

In a yet further aspect, this invention resides broadly in a method of producing mixed hydrogen and oxygen comprising the steps of:

providing gas production apparatus comprising a housing containing acidified water electrolyte and a plurality of substantially planar electrodes disposed in substantially parallel spaced relation in said electrolyte, the inter electrode distance being selected whereby produced gases are constrained by adjacent electrodes to cause turbulence in said electrolyte at the respective electrode planar surfaces;

connecting alternate ones of the electrodes to respective poles of a direct current supply of potential difference sufficient to cause electrolysis of said electrolyte;

collecting generated gas from the top of said housing, and supplying make-up water to said housing to replace that electrolysed to gas.

In order that this invention may be more easily understood and put into practical effect, reference will now be made to the accompanying drawings which illustrate a preferred embodiment of the invention, wherein.

Figure 1:
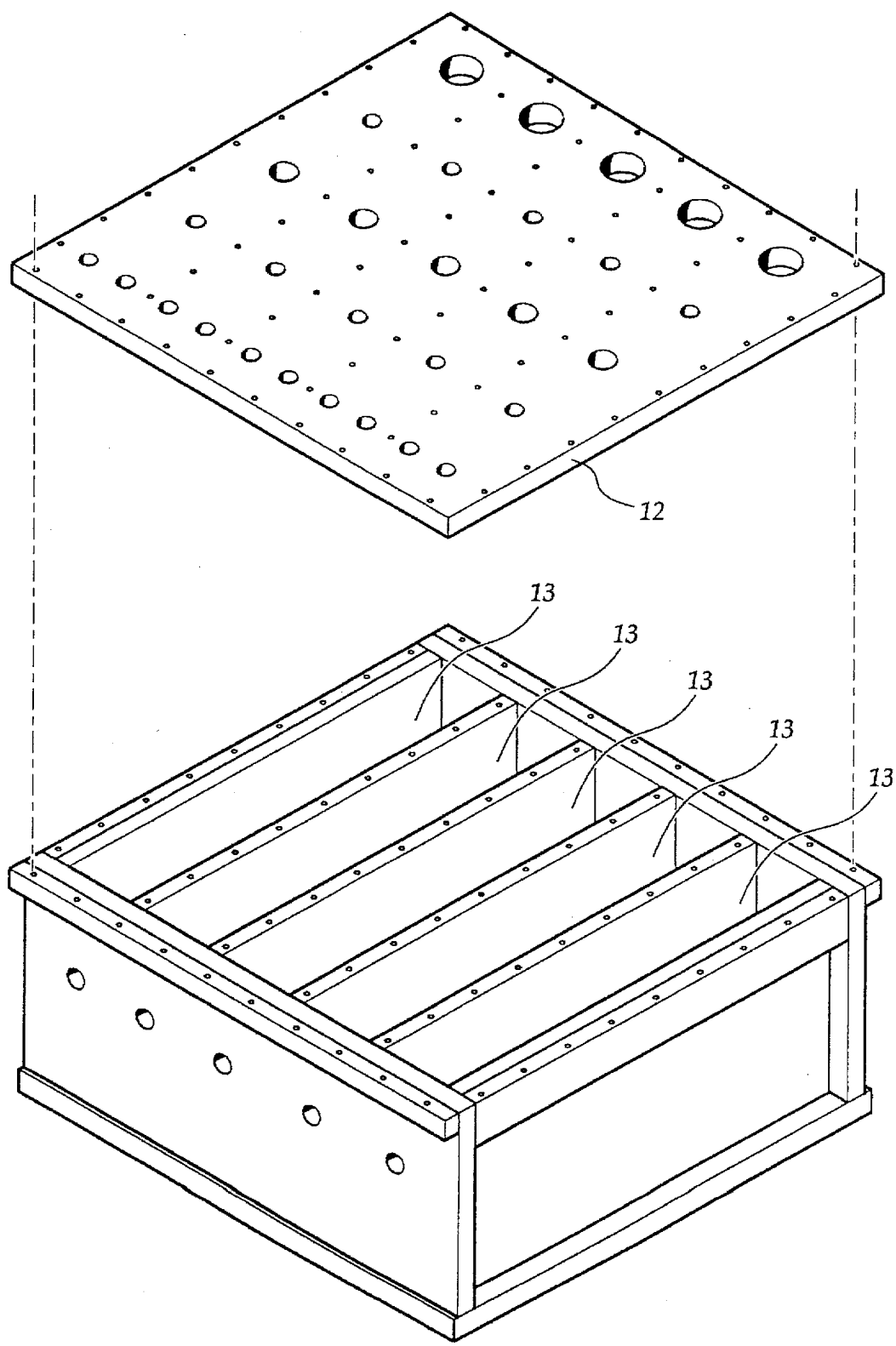
FIG. 1 is an exploded to perspective view of apparatus in accordance with the present invention.
Figure 2:
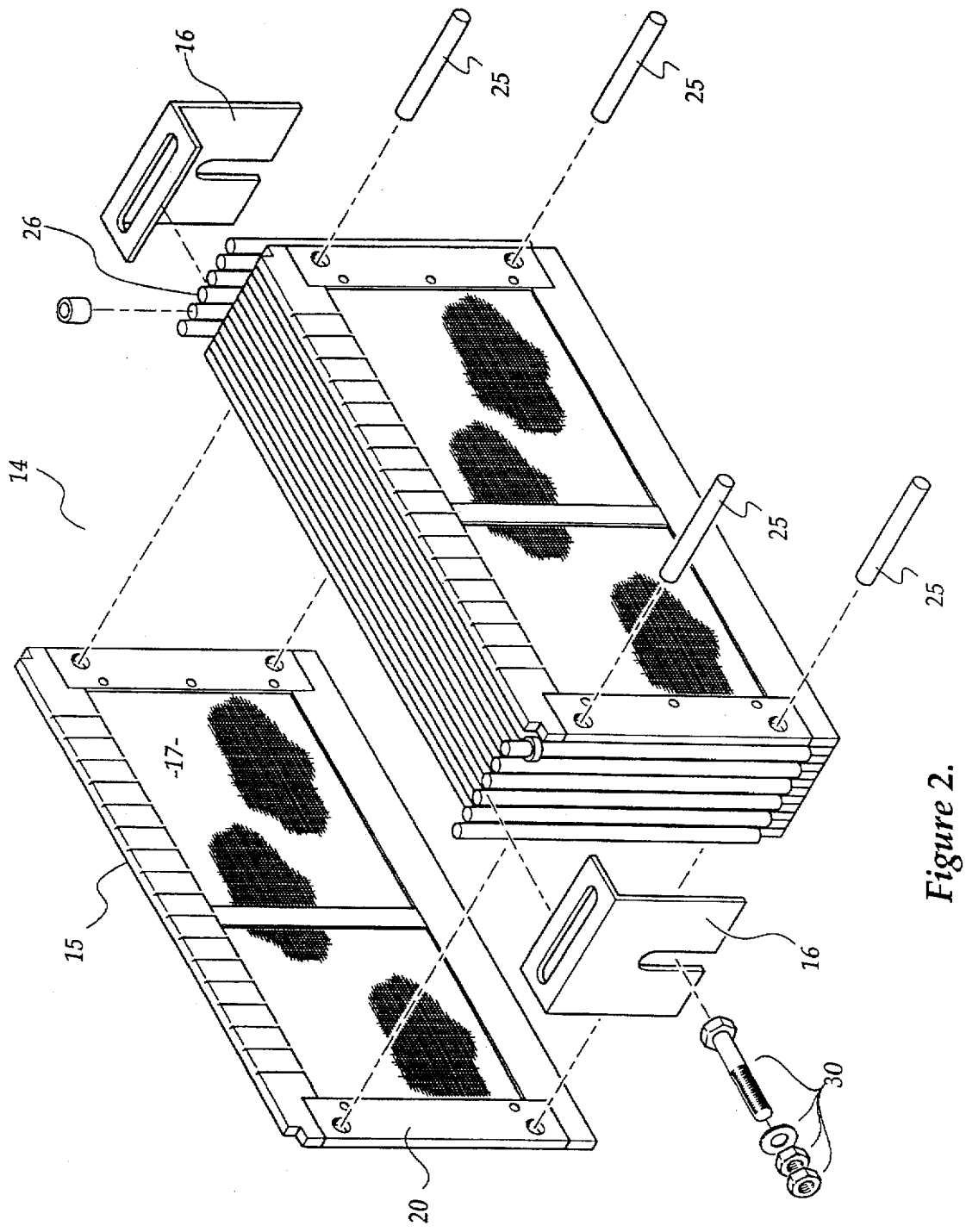
FIG. 2 is a top perspective view of an electrode for use in the housing of FIG. 1.
Figure 3:
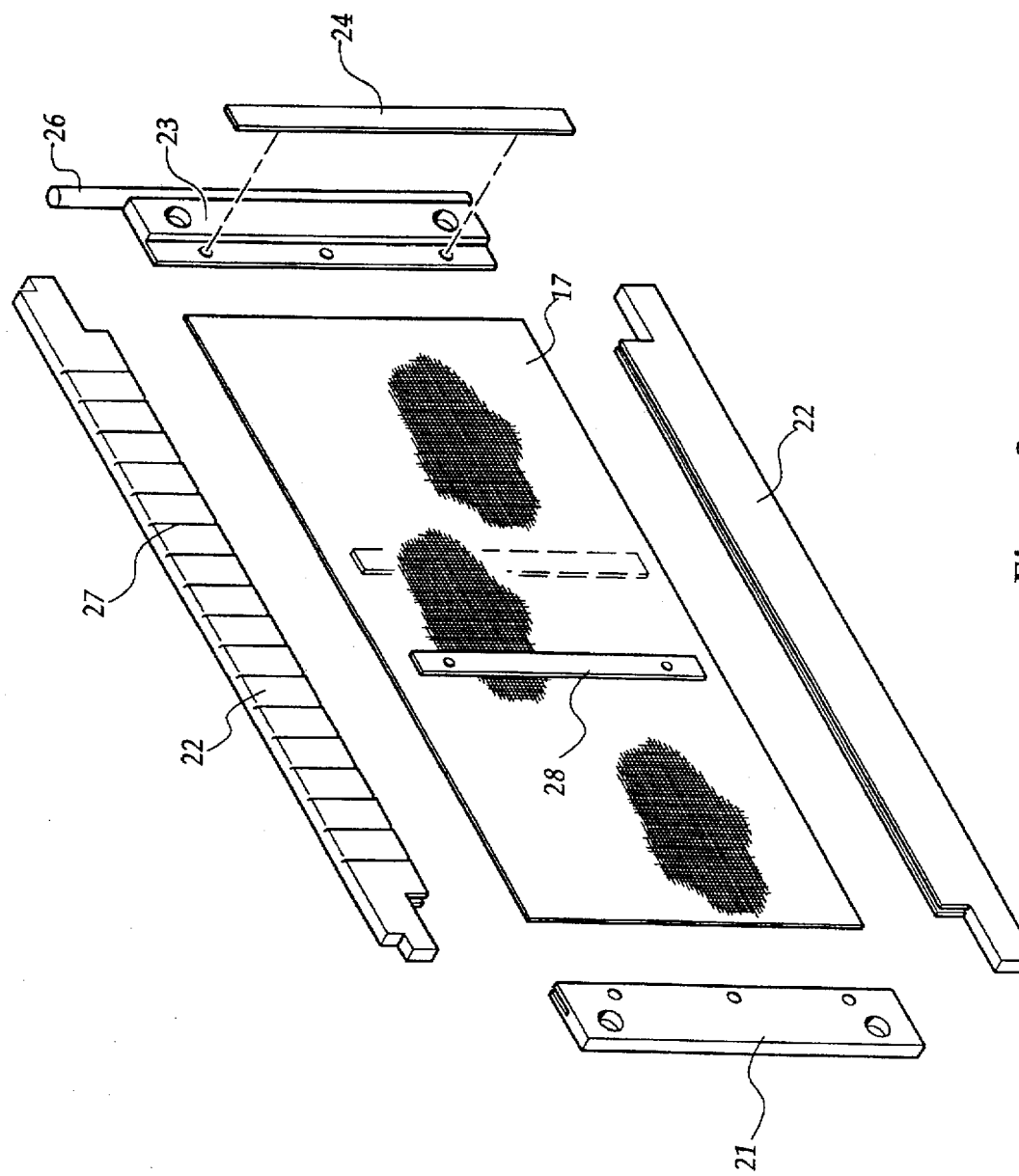
FIG. 3 is top perspective exploded view of a single electrode of the array of FIG. 2.

With reference to the figures there is provided electrolytic gas producer apparatus 10 including a housing and housing cover 12, the housing 11 being divided into five cell mounting chambers 13. Each cell mounting chamber 13 includes in electrode assembly 14 comprised of thirteen electrodes 15 each, the electrodes alternating in the assembly between being connected to one or the other of a pair of poles 16.

Each of the electrodes comprises a 316 grade stainless steel mesh body portion 17 which has been coated with platinum black and mounted in a plate housing 20 including an insulative end member 21 and rap and bottom members 22 of an acid resistant P.V.C. and a 316 stainless steel terminal assembly 23. The plate housing 20 acts as both a support for the body portion 17 as well as a spacer and insulator between each of the electrodes 15 within the cell, being slotted in the case of the PVC components to receive the mesh portion 17 and provided with a clamping member 24 for optimising electrical integrity of the terminal assembly 23 with the mesh 17.

The electrodes 15 are alternated with the terminal assembly of an electrode bearing on the insulating end members 21 of the adjacent electrodes 15. The physical and electrical integrity of the electrode assembly 14 is provided by stainless steel shorting pins 25. The terminal assemblies 23 each include a threaded stainless steel terminal post and respective terminal posts are made electrically common by the pole plate 16 adapted to receive a conductive stud 30 which passes out through the housing 11 and provides an external electrical connection point for each set of electrodes 15 in a particular electrode assembly 14. The upper members 22 of the plate housings 20 are provided with vertical grooves 27 adapted to allow the passage of generated gas into the headspace of the chambers 13. The mesh portions 17 are also stiffened by insulative stiffeners 28.

Figure 4:
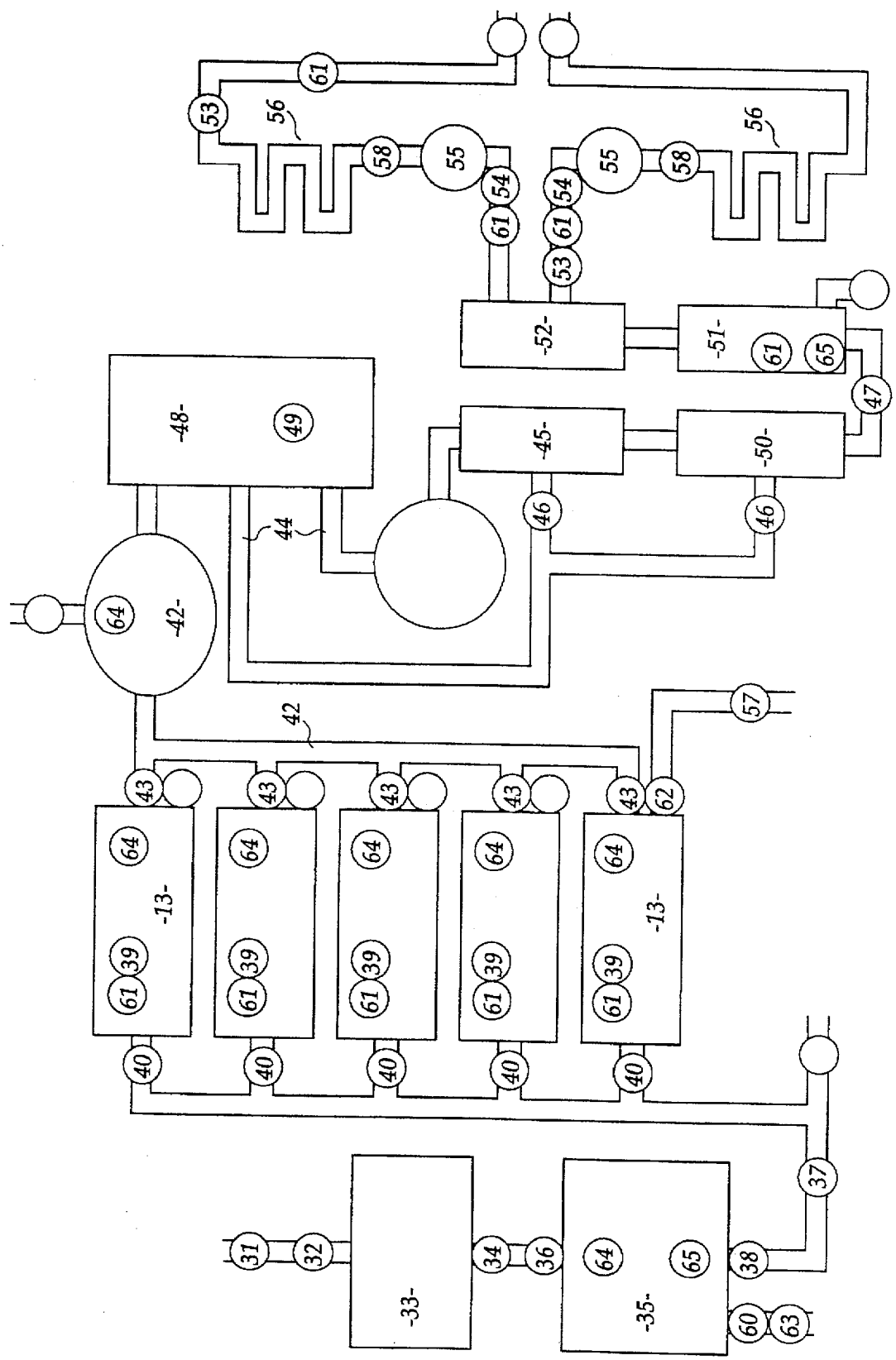
FIG. 4 is a flow diagram through apparatus in accordance with the present invention.
Figure 5:
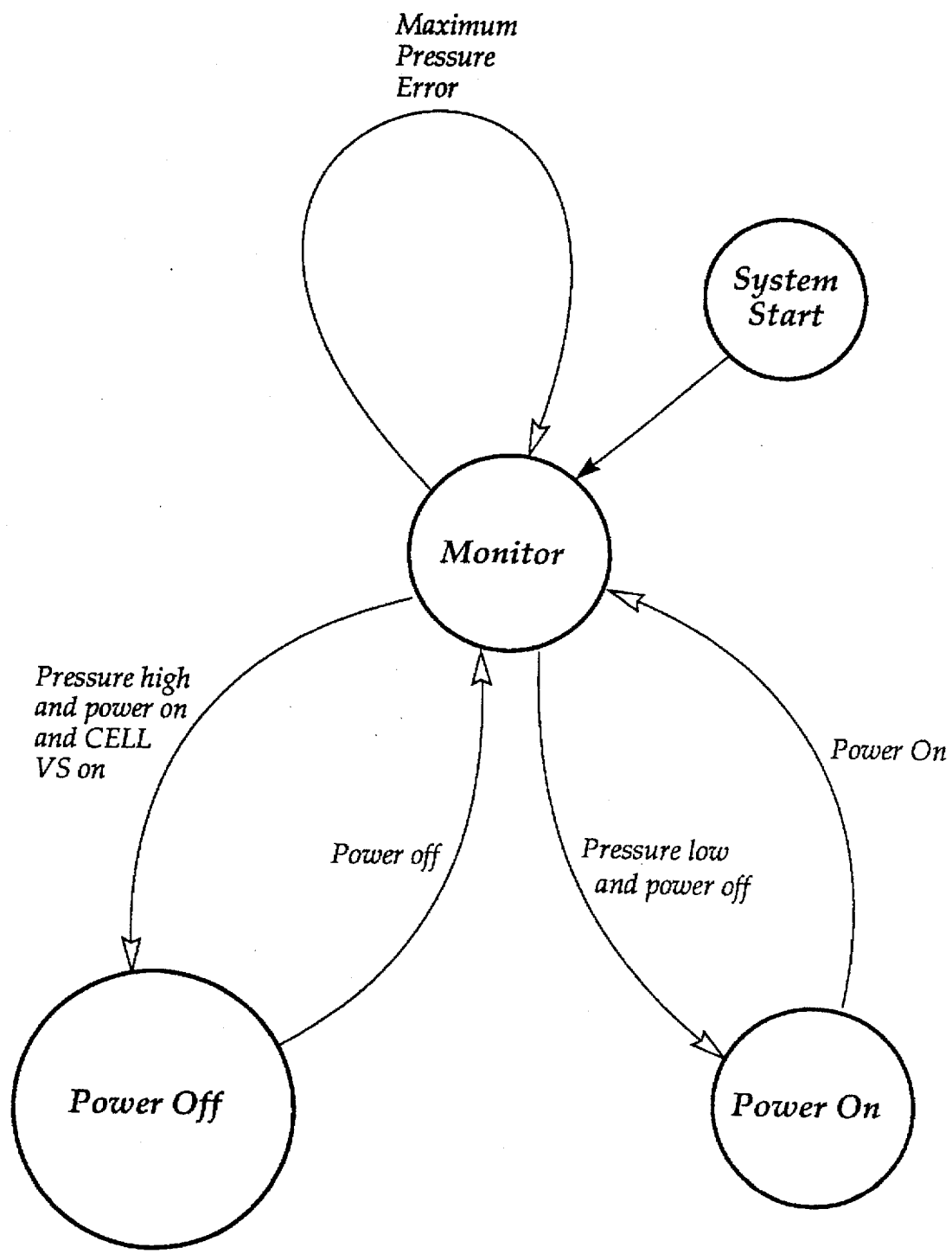
FIGS. 5 to 9 illustrate diagrammatically the logic control systems of the apparatus of FIG. 4, and FIGS. 10 to 15 illustrate diagrammatically the function features of the present apparatus and method.
Figure 6:
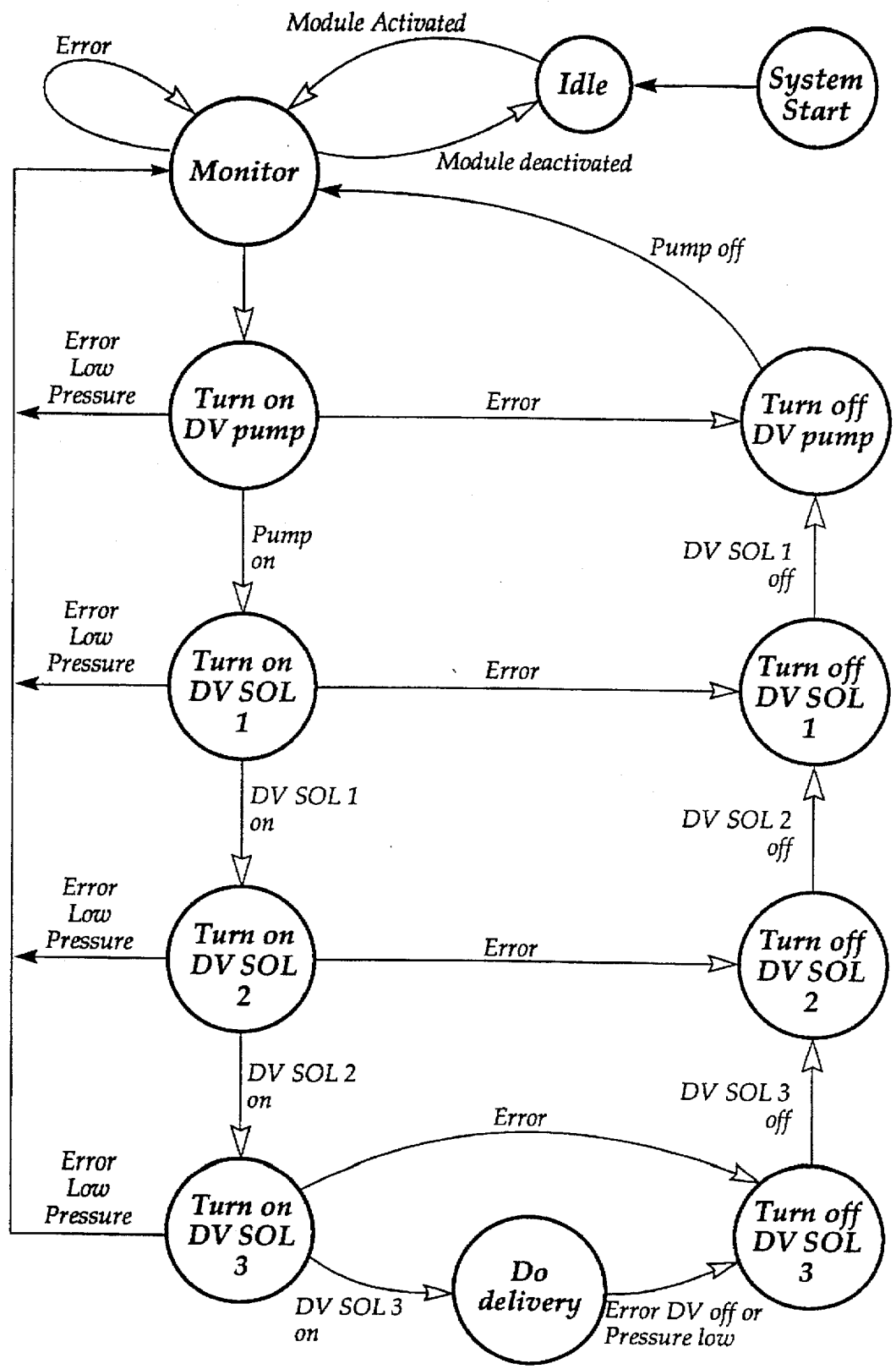
Figure 7:
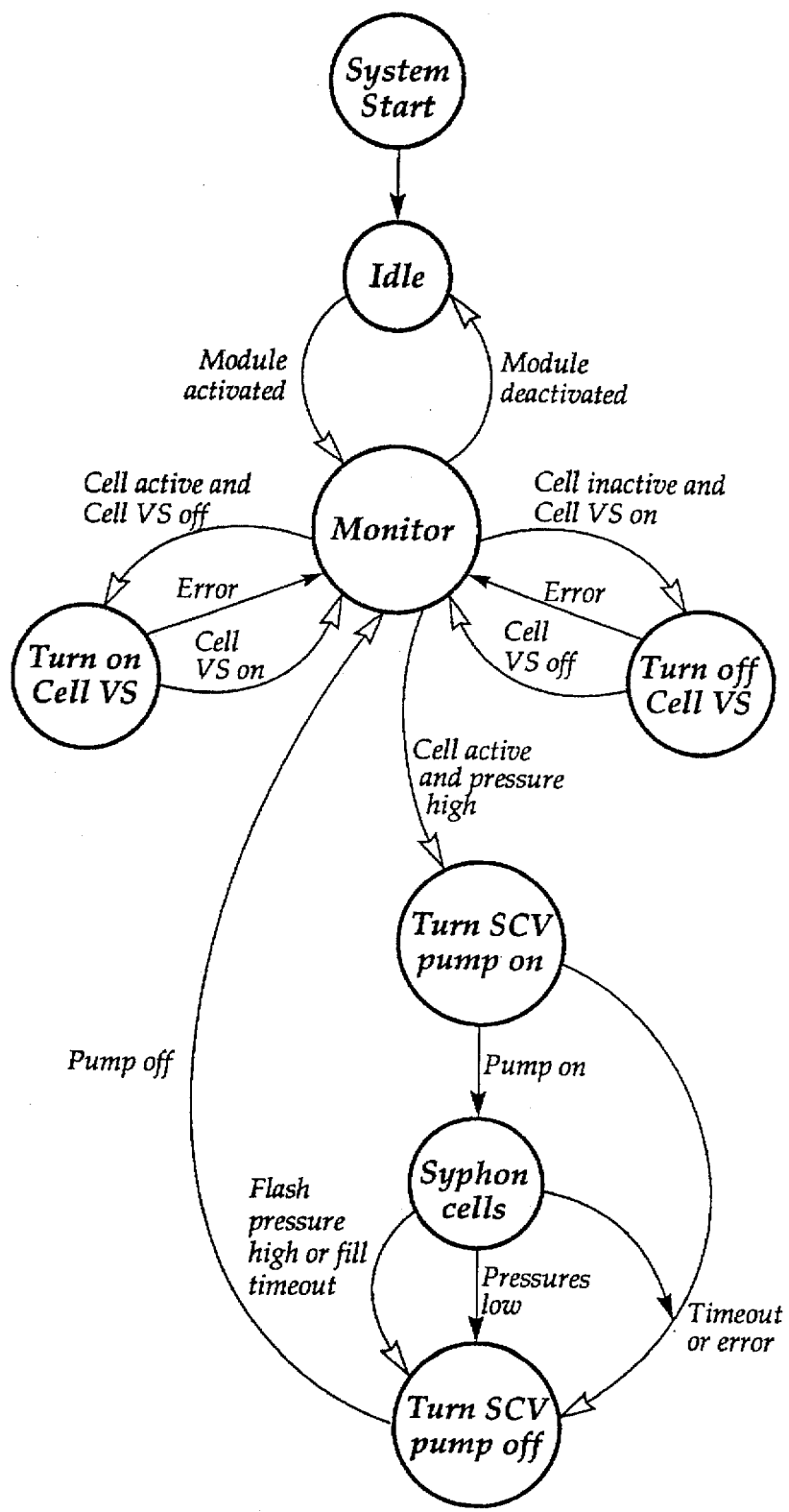
Figure 8:
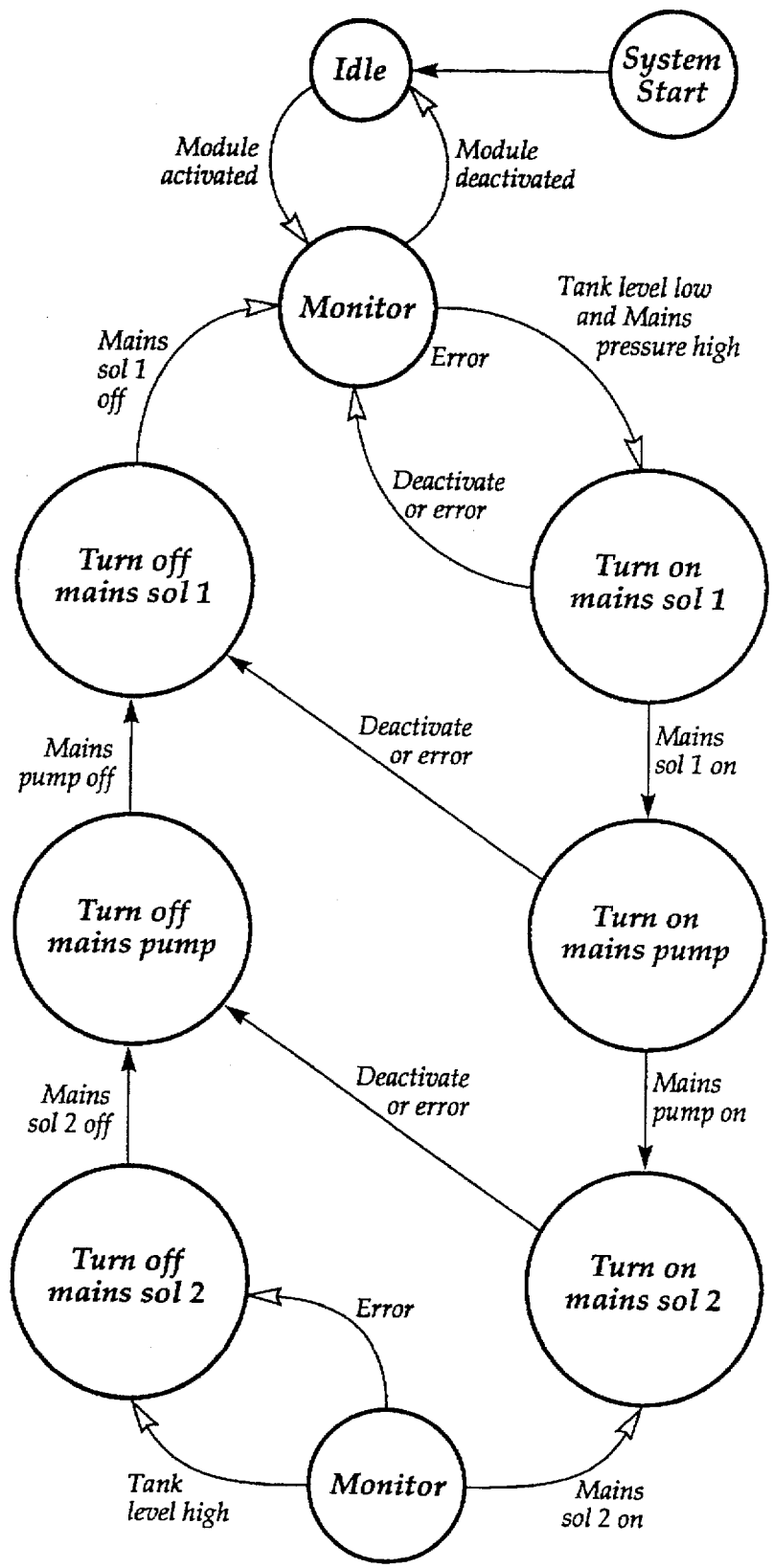
Figure 9:
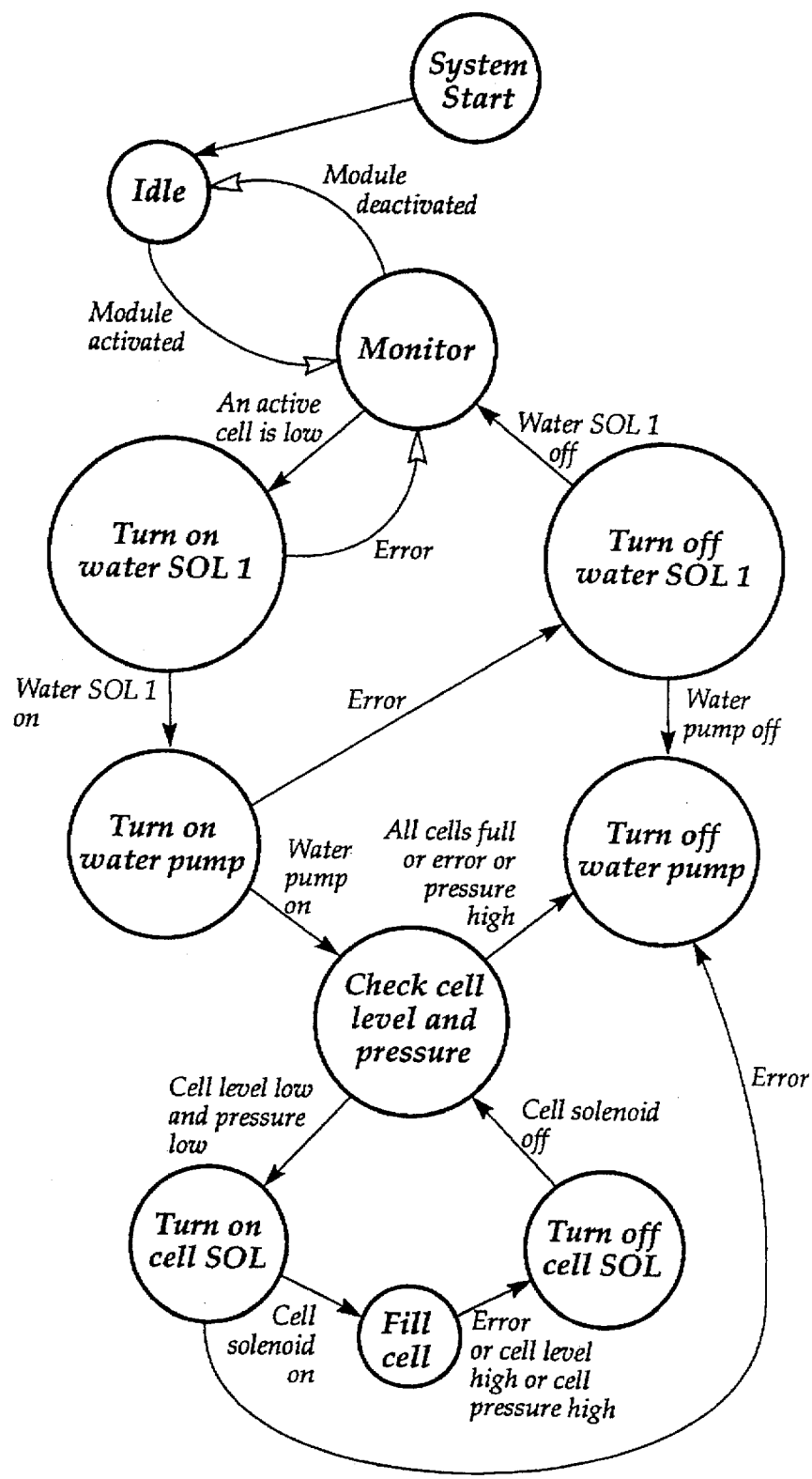

The flow path of liquids and gases are illustrated diagrammatically in FIG. 4, wherein distilled water supply supplies water to the apparatus via a pressure sensor 31 and solenoid valve 32 under microprocessor control through a primary stainless steel filter 33 that removes particulate impurities down to 0.3 of a micron. When the solenoid valve 32 is opened, water is drawn through a 24 volt pump 34, which is also controlled by the microprocessor, and thence to a reservoir 35 of thirty-litre capacity via a further solenoid valve 36. The reservoir 35 is constructed of 316 grade Stainless Steel and is provided with internal baffles to control surge.

The cell chambers 13 are maintained at a selected electrolyte level by means of a supply pump 37 controlled by solenoid valve 38 and delivering to each cell via a bank manifolded solenoid valves 40, each being under the control of a level sensor 39 as well as being under master control of the microprocessor which monitors levels within the cell chambers 13.

The housing cover 12 is provided with gas outlet apertures 41 which extend from the inside of the cell chamber upwards to a collection line by means of an inverted conical chamber which causes liberated gases to swirl therethrough.

This results in entrained droplets being substantially deposited on the conical walls whereupon the droplets are returned to the cell under gravity. The gas outlets from each of the five cell, passes into a pooling manifold 42 via individual solenoid valves 43. From the manifold 42, the gas is then fed to a wash tank 48 providing a headspace of gas therein. By taking the gas through pipes to the bottom of the wash tank 48 the gas is water scrubbed which provides for both a flashback arrest and removal of entrained electrolyte. The gas is removed from the water tank via a stainless steel manifold 44 including a back pressure controller 49 under microprocessor control. From the twin outlets of the manifold 44 the gas is passed to a double headed vacuum pump 47 which draws the gas through a first filter 45 including a drain line adapted to return liquid contaminants, mostly water, to the wash tank 48 via valve 46, and a secondary filter 50 of the Cuno type for residual moisture removal. This removes moisture to 0.3 of a micron. After she pump 47 the gas passes into a flashback arrester 51 filled with woven 316 Stainless mesh and 25 cm of water. The gas enters the flashback arrester under the water level. The gas then travels in two lines to a moisture removing filter 52 of the Cuno type, whereafter it enters delivery pumps 53 which pressurises the gas to 36 psi for delivery via intermediate solenoid valves 54, an outlet manifold 55 having a pressure regulatory function, and final solenoid valves 58 which control delivery to an electronically monitored outlet flashback arrester 56. The outlet flashback arrester contains two infrared sensors to detect and signal a flashback condition to the microprocessor for safety. In the event of a flashback, the infrared sensors detect a change in heat coming back up the tube. This change activates a solenoid to cut-off the gas flow.

The input power to the apparatus is microprocessor selectable to accept 240, 110, 32, 24, 12 volts. The output voltage is variable up to 7.5 V with a current rating up to 1000 amps. Typically the apparatus utilizes power at 7.5 volts AC RMS at 30 amps for the electrolytic process.

The apparatus is also provided with pump out facility for the cells (pumps 57 and solenoids 62) and the reservoir (pump 60 and solenoid 63), and the monitoring process includes a plurality of pressure sensors 61 and temperature sensors 64 monitoring the pressure and where appropriate temperature in the cell chambers 13, the reservoir 35, the manifold 42 the outlet delivery pumps 53, as well as level sensor 65 in the reservoir 35 and the water trapping filter 51.

In the FIGS. 5 to 9 these represent the control logic path for the power supply, gas delivery, cell gas clearance, reservoir top up and cell top up processes respectively. In these figures, descriptive matter is included as required for explanation of the processes and wherein the term CELL VS refers to the cell vapour solenoid valve, DV pump refers the gas delivery pump, DV SOL 1 and 2 refer to the first, second end third gas delivery solenoid valves respectively, SCV pump refers to the pump delivering the gas from the cell headspace, mains sol 1 and 2 refer to the solenoid valves 32 and 36 of FIG. 4, water SOL 1 refers to the solenoid valve 38 of the apparatus of FIG. 4 and cell SOL refers re the solenoid valve 40 of each cell.

The functional diagrammatic description illustrated in FIGS. 10 to 15 illustrate the functional features of apparatus and ancillary apparatus.

Figure 10:
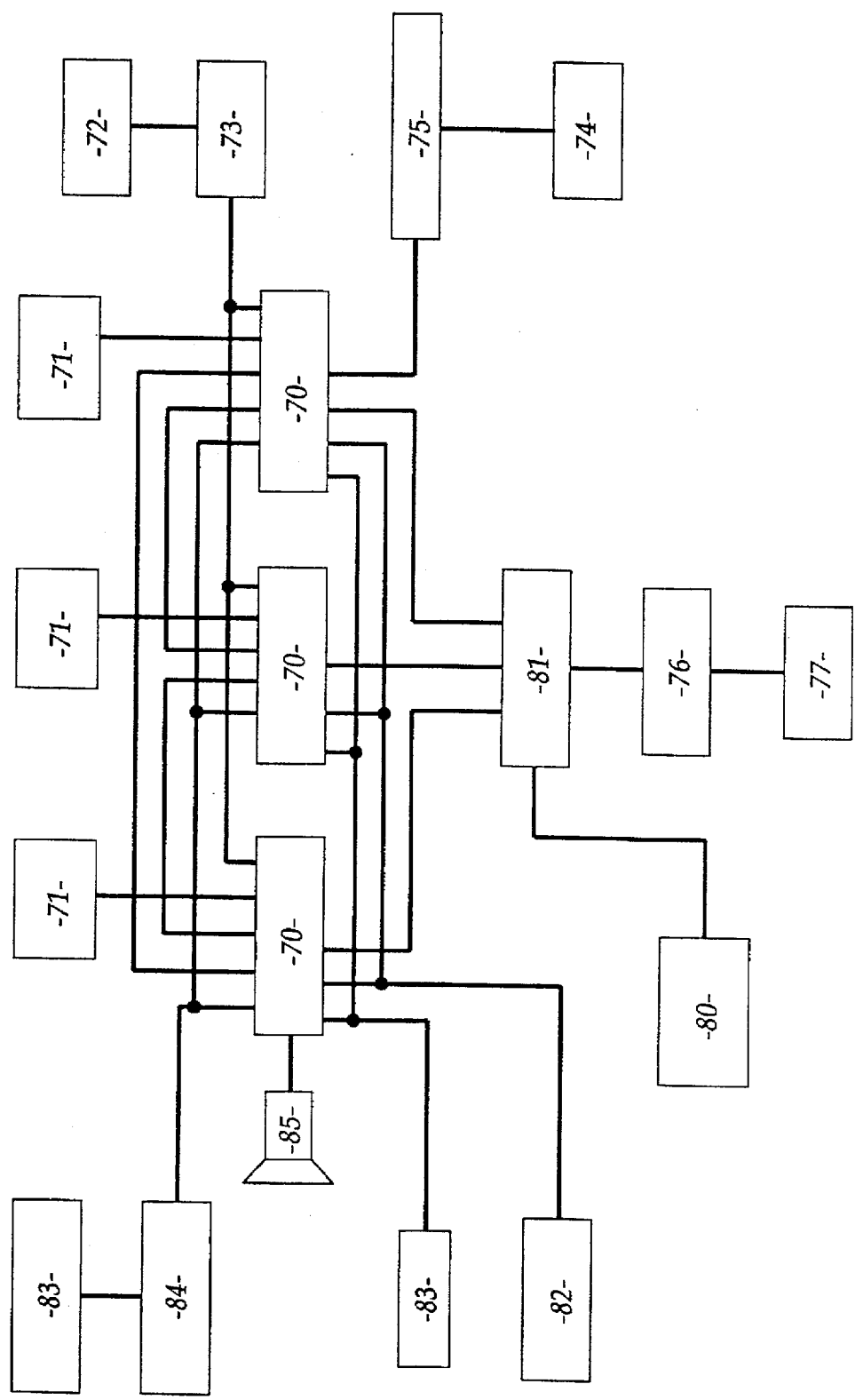

FIG. 10 illustrates a preferred control arrangement wherein three independent microprocessor control boards 70 provide master control redundancy and are networked via a TOKEN-RING™ network and connect with an operator control terminal (not shown) by an RS-422 protocol interface. Each microprocessor control board 70 is powered by its own power 24 VDC power supply 71, and the three power supplies 71 are backed up dynamically by a backup battery 72 controlled and charged by battery controller 73.

Mains AC current operated devices such as a final deliver gas pump 74 are switched by The controller boards 70 via mains current relay switch 75. Active DC powered devices such as electronic flash back arrester at solenoids 76 and their optical sensors 77 as well as an emergency cut out switch array 80 are bussed to a 24 VDC sub controller board 81 responsive to and providing inputs for the main controller boards 70.

Passive switch sensors such as pressure transducers 82 and other solenoids 83 input directly to or are driven directly by the main controller boards 70. Scalar sensors such as temperature sensors 83 are interpreted by an interface 84 and data transmitted to the main controller boards 70 by the communications protocol determined thereby. An audible alarm 85 is driven by the main controller boards in response to a fault condition.

Figure 11:
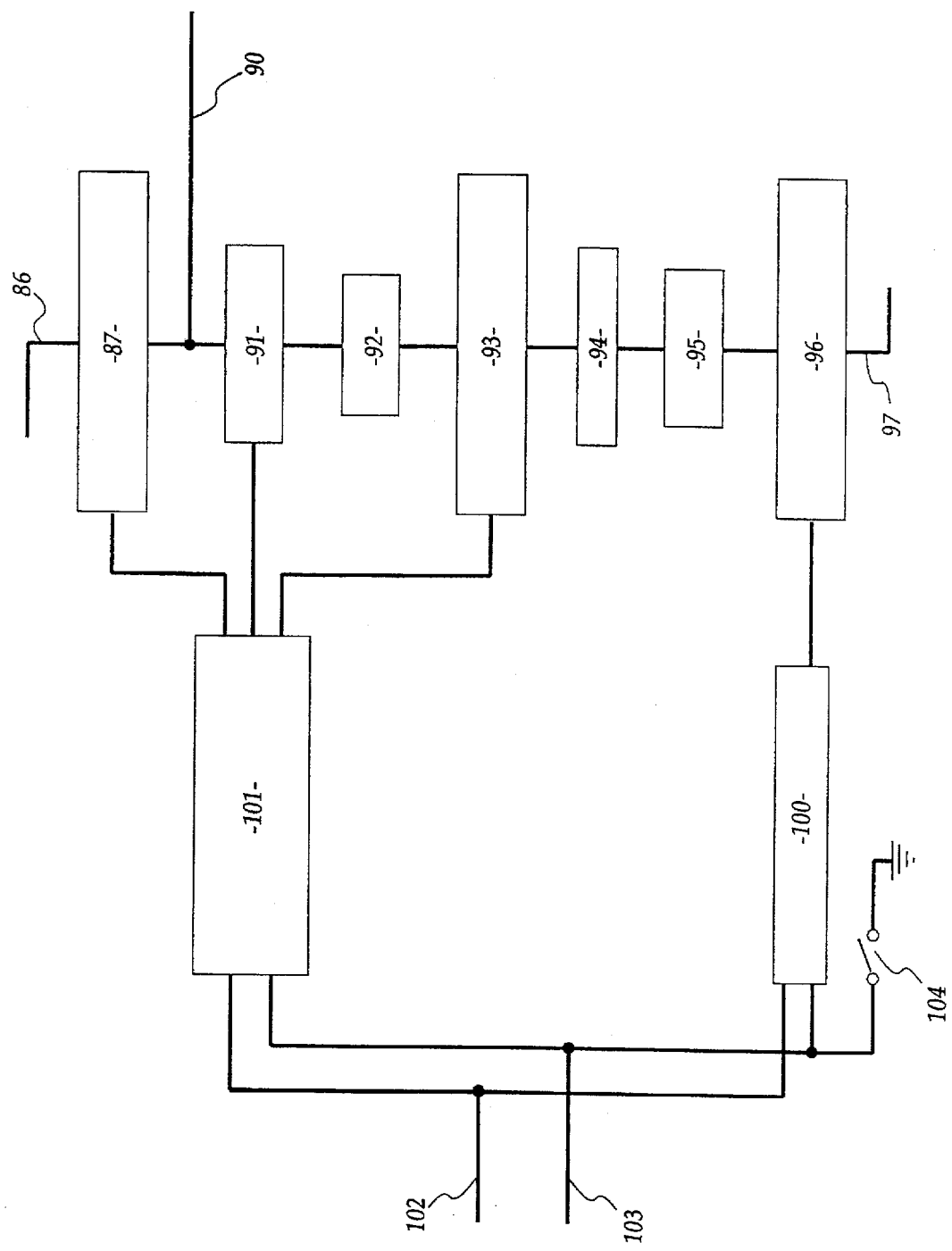

FIG. 11 describes power control for each of the cell assemblies and includes an AC mains supply input 86 to a primary AC voltage and current transformer 87 having output 90 to readout instrumentation monitoring AC supply and transformer output. Raw AC subvoltage power is fed through a main switch 91 to variac 92 to staged secondary AC voltage and Current transformer 93 and tertiary voltage transformer 94 connected to a selenium rectifier 95 to provide DC current to drive the cell assembly.

The rectifier 95 output provides input for a DC voltage and current transformer 96 connected via output terminals 97 to the cell assembly electrodes. Cell assembly current draw and operating voltage is monitored and controlled by monitor module 100 responsive to and providing input to power controller 101, the monitor module 100 and power controller 101 being mutually connected to the main controller boards 70 by SCI interface 102. The power controller 101 provides data on power consumption and zero crossover detection from the transformers 87, 93 as well as responding to input from safety override command interface 103 isolated from the data interface 102.

The power controller also provides mains isolation switching of the mains switch 91, switching at the cell assembly by control of the monitor module 100 and overload protection. An emergency override switch 104 couples to the safety override interface 103 to provide manual master shut down control for the cell power control assembly.

Figure 12:
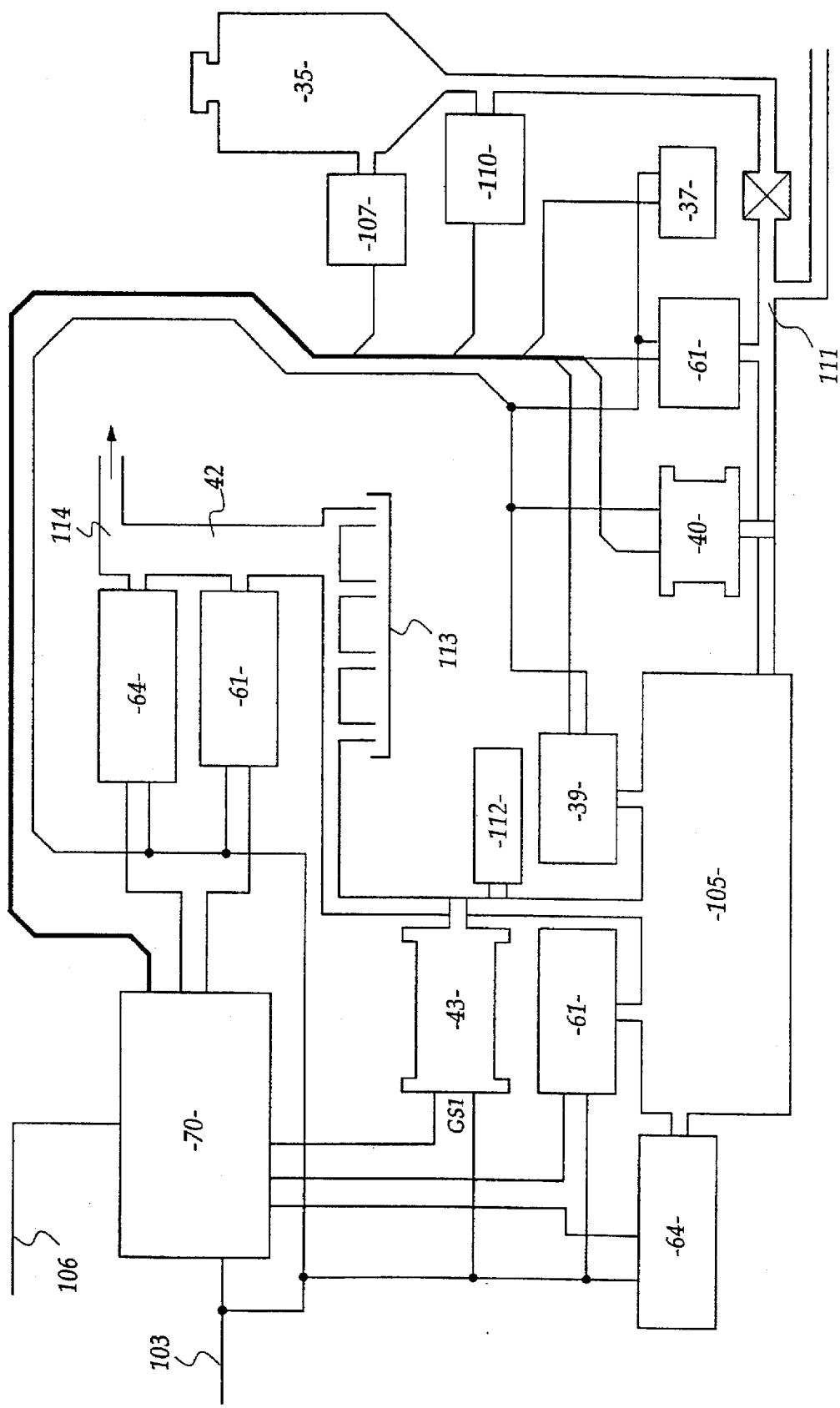
Figure 13:
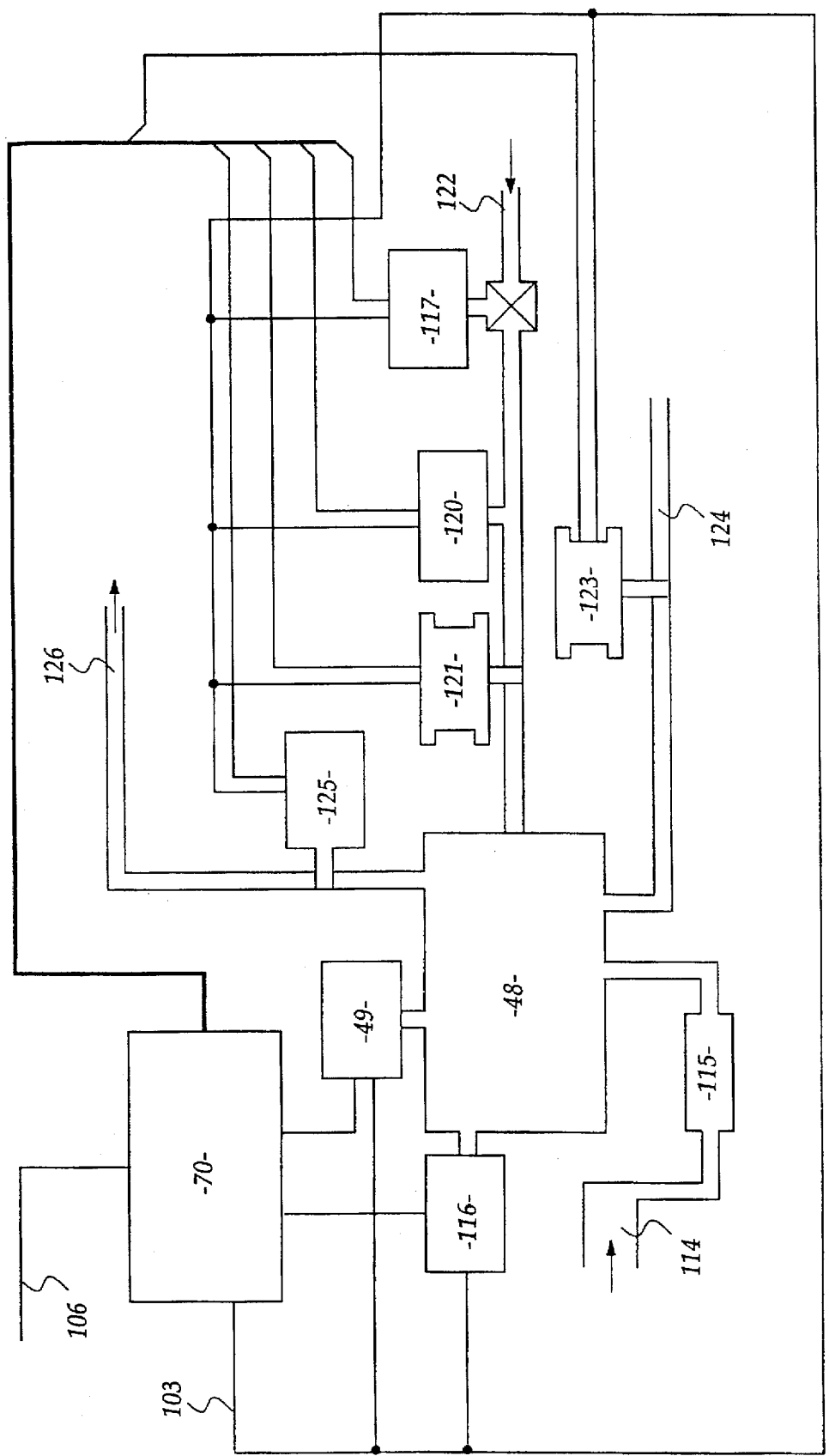
Figure 14:
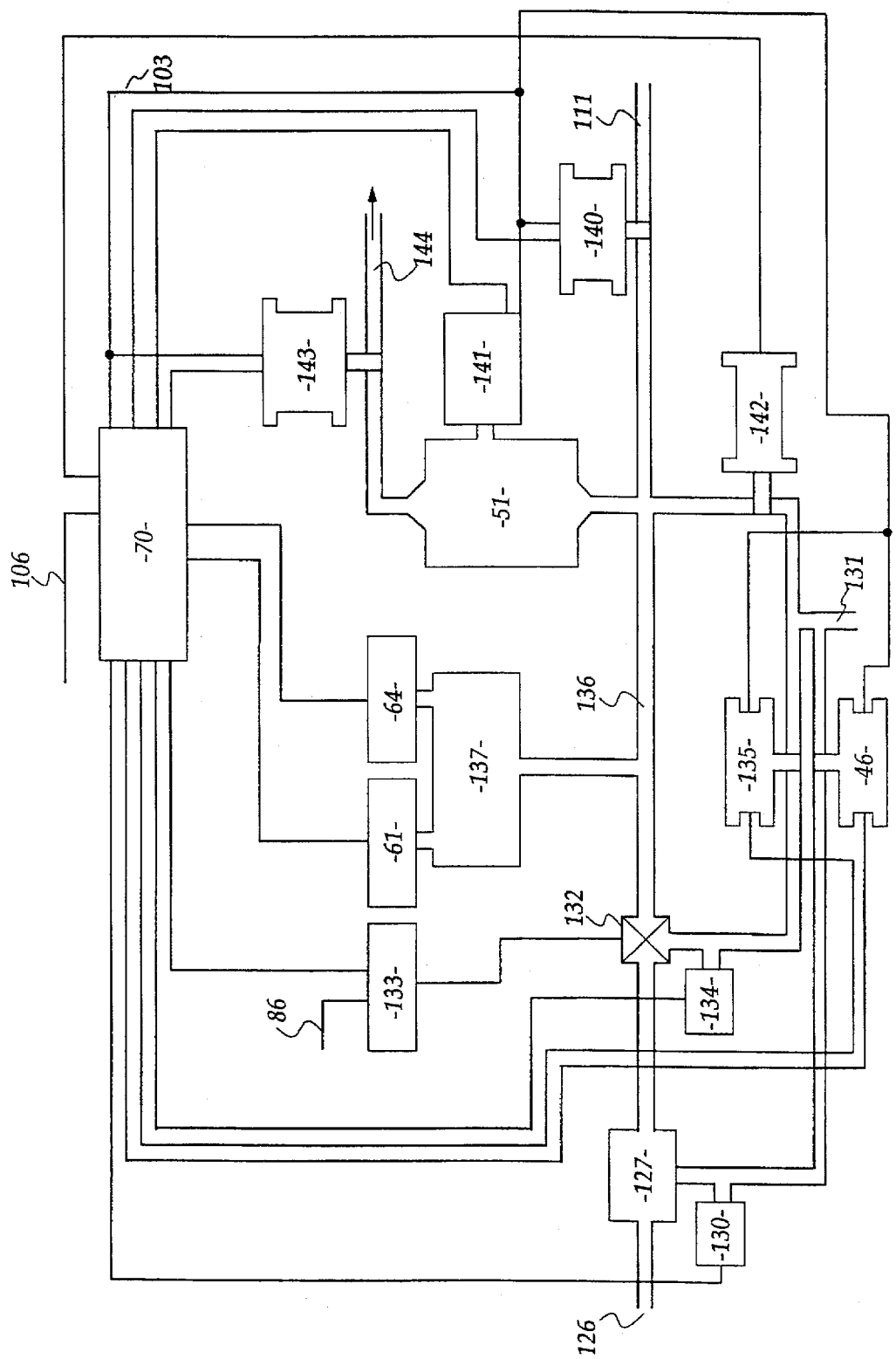
Figure 15:
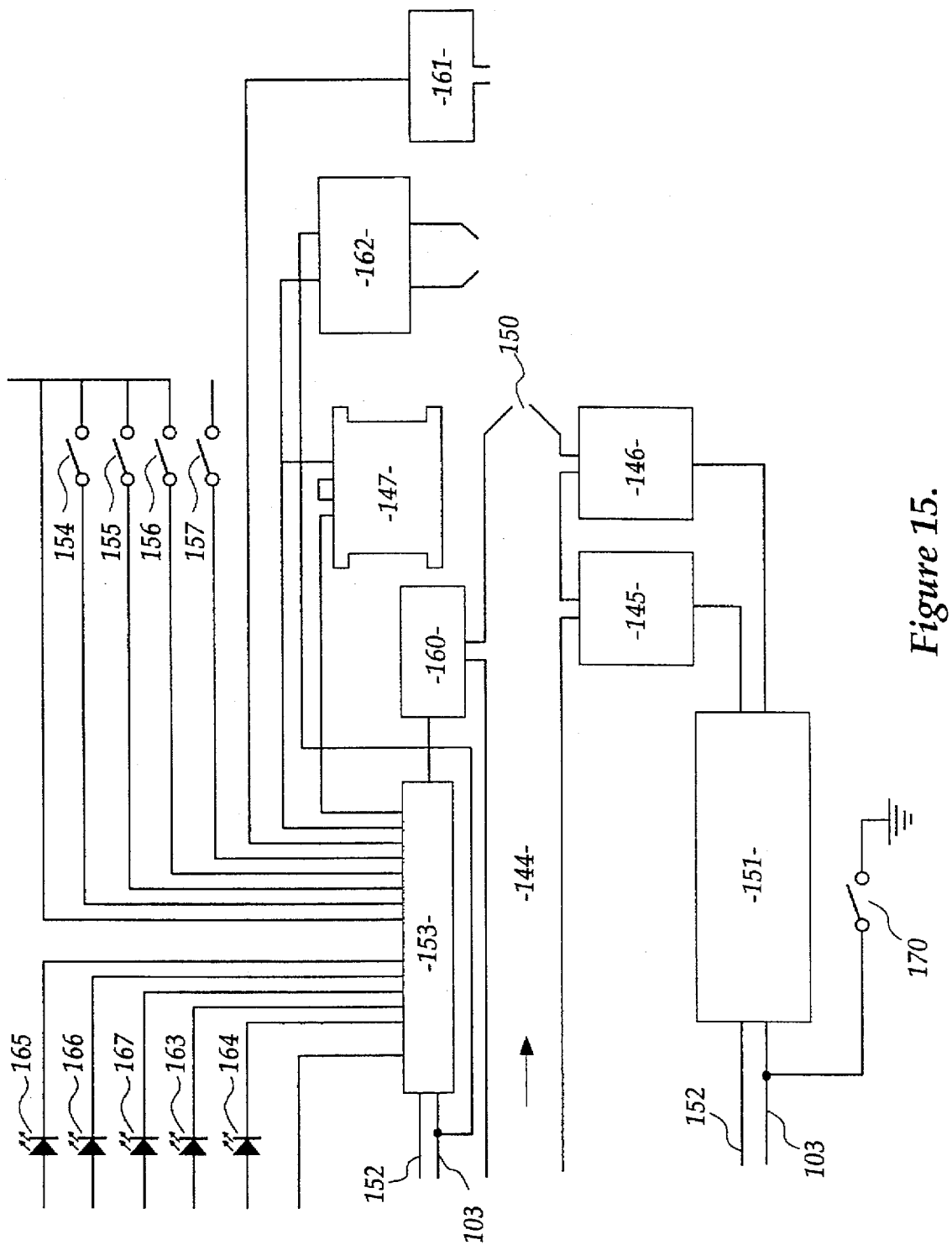

FIGS. 12, 13 and 14 illustrate diagrammatically the principal functional gas and water operating features under the control of the main controller boards 70, illustrated with reference to a single board and single cell assembly 105 for clarity. The operator control terminal RS-422 interface 106 and safety override interfaces 103 are as described above.

The water reservoir 35 is equipped with a low-water sensor 107 and a no-water sensor 110 providing data to the main controller board 70 on rank status. The supply pump 37 delivers water to both the cell assembly 105 and flashback arrester 51 via delivery manifold 111. Delivery pressure in the manifold 111 is monitored by the main controller board 70 via water pressure sensor 61.

The cell assembly 105 includes an electrolyte level sensor 39 providing control input for the main controller board to operate the water inlet solenoid valve 40 and thence maintain electrolyte levels. The cell assembly is also equipped with a pressure sensor 61 of 100–200 kPa range and K thermocouple temperature sensor 64 of 0°–100° C. range. Each of the temperature 64, delivery and cell pressure 61 sensors, the supply solenoid 40 and pump 37 are connected to both the control board 70 and the safety override interface 103.

Gas produced by electrolysis passes from the cell assembly 105 via a metering orifice 112 and gas control solenoid valve 43 to a gas manifold 42 where the flow combines with that from the other cell assembly outputs 113. The gas manifold 42 is equipped with its own pressure sensor 61 of 100–200 kPa range and temperature sensor 64 of 0°–100° C. range which, with the gas control solenoid valve 43 are connected to both the control board 70 and the safety override interface 103.

Gas passes from the gas manifold 42 via outlet 114 to the bottom of the water-containing gas wash tank 48 via a non return valve 115, where the gas is water scrubbed to eliminate traces of electrolyte. The gas wash tank is provided with a water level sensor 116 and back pressure sensor 49, the water level being interpreted by the main controller board 70 to control water entry to the wash tank via water pump 117, pressure sensor 120 and solenoid valve 121 from a separate water supply 122. Each of the water level sensor 116, back pressure sensor 49, water pump 117, pressure sensor 120 and solenoid valve 121 are also bussed to the safety override interface 103.

The wash tank 48 may be periodically drained under control from the main controller board 70 via drain solenoid 123 and drain 124 which may also provide for gas purge in response to the safety override interface 103. Gas passes from the wash tank 48 via gas solenoid valve 125 and conduit 126 to the filter assembly 127 including water level sensor 130 operating under control to periodically purge accumulated wash tank water to a waste outlet 131 via solenoid valve From the filter assembly the gas passes to a gas pump 132, mains 86 powered by switch 133 and being of one water trap type having its own water level sensor 134 and solenoid valve 135 to the waste outlet 131. Gas delivered by the pump 132 passes to the flashback arrester 51 via conduit 136, the output of the pump being buffered by a gas reservoir 137 disposed in the conduit 136. The gas reservoir 137 is provided with a pressure sensor 61 of 100–200 kPa range and temperature sensor 64 of 0°–100° C. range.

Water supply to the flashback arrester at 51 via water manifold 111 is controlled by water inlet solenoid 140 responsive to both the water level sensor 134 of the pump 132 and a water level sensor 141 associated with the flashback arrester, such that water levels may be maintained in both by this means. The flashback arrester 51 is drained by means of outlet solenoid 142 to waste outlet 131.

From the flashback arrester 51, gas passes to its end use, for the purposes of description in this case a burner assembly, via a main gas solenoid valve 143 to gas conduit 144. The burner assembly includes the electronic flashback arrester 56 of FIG. 4 which in this case comprises first 145 and second 146 infrared flashback sensors located up and downstream respectively of a gas control solenoid valve 147 in the conduit 144. The second flashback sensor is located just upstream of a burner jet 150 terminating the conduit 144. The flashback sensors 145, 146 are driven by a control module 151 including light sensor driver and high speed amplification of signal functions, which in turn drives the safety override interface 103 and communicates with the main controller board 70 by SCI interface 152.

Also connected to the SCI interface 152 and safety shutdown interface 103 is a burner control module 153 which controls the gas control solenoid in response to console and main board inputs as well as via an on switch 154, off switch 155, increase-flow 156 and decrease-flow 157 switches, burner pressure sensor 160 and ignition detection sensor 161. The burner control module also drives a burner igniter 162 as well as a power indicator LED 163 and burner-ready LED 164. For test purposes, the burner control module also drives IR-LEDs 165, 166 to test the first and second 146 infrared flashback sensors respectively, and a further IR-LED 167 for testing the ignition detection sensor 161. An emergency override switch 170 is provided to give manual emergency shut down control.

It will of course be realised that while the above has been given by way of illustrative example of this invention, all such and other modifications and variations thereto as would be apparent to persons skilled in the art are deemed to fall within the broad scope and ambit of this invention as is herein set forth.

I claim:

1. A gas production apparatus for producing a gas through electrolysis of an electrolyte of a dilute aqueous solution of a mineral acid catalyst selected from the group consisting of a hydrogen halide acid, a sulphuric acid and a nitric acid including:

a housing adapted to contain said electrolyte, said housing substantially sealed and wherein gases produced exit the housing via a valved inlet and outlet apertures;

electrodes at potential difference sufficient to cause electrolysis of said electrolyte to form a gas;

a water supply means adapted to maintain said electrolyte;

collection means for gases produced by said electrolysis, wherein said electrodes are mounted in electrode frames which support the electrodes in the housing, said electrodes comprising a plurality of electrode assemblies of alternating polarity configured with insulative said frames such that the electrodes may be stacked in close parallel configuration, and wherein said electrodes comprise a substantially inert material selected from the group consisting of a noble metal, a graphite metal, a stainless steel, the stainless steel being formed of a steel mesh material having a coating of platinum black deposited thereon, wherein said electrode frame includes a conductive portion adapted to bear on a corresponding insulative portion of an adjacent electrode frame and providing a mounting for a conductive pole, whereby the conductive poles of like electrodes may be bussed together for connection to one of a positive and negative pole of a supply of direct current.

2. Gas production apparatus according to claim 1, wherein said supply means is sealed with respect to said housing.

3. Gas production apparatus according to claim 1, wherein said electrolyte supply means is adapted to furnish a combination of a deionized water/hydrochloric, acid of concentration of about $2.4 \times 10^{-3}$M.

4. Gas production apparatus according to claim 1, wherein said supply means is adapted to furnish purified water of submicron filtration, reverse osmosis, distillation or deionization.

5. Gas production apparatus according to claim 1, including a means for periodically reversing the polarity of said electrodes thereby disrupting deposition of depositable salts on the electrodes.

6. Gas production apparatus according to claim 1, wherein said supply means includes control means responsive to electrolyte level and/or acid concentration.

7. Gas production apparatus according to claim 6, wherein said control means is selected from one or more of float controlled valve means, or electronic level sensing means, gravimetric or pH sensing sensor means operable to switch a valve by means of a solenoid or other electromechanical actuator.

8. Gas production apparatus according to claim 7, further including an intermediate tank, wherein said supply means is adapted to supply water to said intermediate tank prior to admission to the housing, the intermediate tank being configured as a water trap for the gas output from the apparatus.

9. Gas production apparatus according to claim 6, wherein the programmable logic controller is adapted to monitor a gas volume output of the apparatus.

10. Gas production apparatus according to claim 9, wherein said programmable logic controller is adapted to display any physical sensor measurement.

11. Gas production apparatus including:

a housing adapted to contain an electrolyte;

electrodes at potential difference sufficient to cause electrolysis of said electrolyte to form a gas;

supply means adapted to maintain said electrolyte;

collection means for gases produced by said electrolysis, said collection means comprises a top portion of the housing having an aperture leading gas from the housing thereby and including separator means adapted to return at least some of an electrolyte mist entrained in the gas back to the housing, wherein said separator comprises a blind sleeve having a hollow conical collection member disposed on the blind end thereof, the apex of the conical collection member being directed substantially upstream of the gas flow, the conical surface having one or more delivery openings therethrough disposed away from the apex and providing a passage for gas downstream of the separator.

12. Gas production apparatus according to claim 11, wherein said housing comprises a plurality of housing portions each with its own supply means electrodes and collection means, each housing portion comprising a cell assembly of the apparatus.

13. Gas production apparatus including:

a housing adapted to contain an electrolyte;

electrodes at potential difference sufficient to cause electrolysis of said electrolyte to form a gas;

supply means adapted to maintain said electrolyte;

collection means for gases produced by said electrolysis; and power supply means controlled by a control means, said power supply means selected to be responsive to one or more conditions of said apparatus wherein a plurality of housing portions each comprise a cell assembly and wherein each said cell assembly is provided with its own said controlled power supply means.

14. Gas production apparatus according to claim 13, wherein said control means for the power supply forms a logical or physical part of an integrated control portion of the apparatus, and is adapted to control one or more of the electrolyte level, composition and temperature, the voltage and current consumption, and gas delivery pressure.

15. Gas production apparatus according to claim 14, wherein said control means including a programmable logic controller adapted to be responsive to sensor inputs comprising temperature sensor and a back pressure sensor associated with each cell assembly.

16. Gas production apparatus including:

a housing adapted to contain an electrolyte;

electrodes at potential difference sufficient to cause electrolysis of said electrolyte to form a gas;

supply means adapted to maintain said electrolyte;

collection means for gases produced by said electrolysis; and means adapted for extinguishing the effect of an ignition of the produced gases, said means comprising a flashback arrestor, wherein said flashback arrester comprises sensor means adapted to sense and output a flashback condition, the output of which is used to switch at least one high speed valve means and a current interrupting means.

17. Gas production apparatus according to claim 16, wherein said flashback arrestor comprises an arrestor housing packed with stainless steel wool and adapted to be partially filled with water, a gas inlet led by conduit to a point below the surface of the water, and a gas outlet collecting from a headspace above said water.

18. Gas production apparatus according to claim 16, wherein said flashback arrester comprises a relatively thin, long but low volume path for the gas having a sensor and a fast valve at opposed ends thereof, whereby the propagating flashback condition at the sensor triggers the closure of the valve.

19. A method of producing mixed hydrogen and oxygen gas comprising the steps of:

providing a gas production apparatus comprised of a housing containing acidified water electrolyte and a plurality of substantially planar electrodes disposed in substantially parallel spaced relation in said electrolyte, the placement of the inter electrode being selected such that produced gases are constrained by an adjacent electrode, thereby causing turbulence in said electrolyte at the respective electrode, at a planar surface thereof;

connecting alternate electrodes to respective poles of a direct current supply of a potential difference sufficient to cause electrolysis of said electrolyte;

collecting produced gases from a top of said housing, and supplying make-up water to said housing to replace electrolyte that was electrolyzed to gas;

an integrated control means adapted to control at least one of an electrolyte level, a composition and a temperature, a voltage and a current consumption, and a produced gas delivery pressure, wherein said control means comprises a programmable logic controller responsive to sensor inputs, wherein collection means collecting the gas from the housing is adapted to extinguish ignition of the produced gas; wherein said collection means includes a flashback arrester comprising an arrestor housing packed with stainless steel wool and adapted to be partially filled with water, a gas inlet led by a conduit to a point below a surface of the water, and a gas outlet collecting from a headspace above said water.

20. A method of gas production according to claim 19, wherein said collection means includes a flashback arrester comprising sensor means adapted to sense a flashback condition, the output of which is used to switch one or more of high speed valve means and current interrupting means.

* * * * *